United States Patent
Watanabe et al.

(10) Patent No.: US 12,440,916 B2
(45) Date of Patent: Oct. 14, 2025

(54) SPOT WELDING METHOD

(71) Applicant: HONDA MOTOR CO., LTD., Tokyo (JP)

(72) Inventors: Shinya Watanabe, Tochigi (JP); Hitoshi Saito, Tochigi (JP); Xihao Tan, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 862 days.

(21) Appl. No.: 17/636,110

(22) PCT Filed: Apr. 13, 2020

(86) PCT No.: PCT/JP2020/016280
§ 371 (c)(1),
(2) Date: Feb. 17, 2022

(87) PCT Pub. No.: WO2021/033364
PCT Pub. Date: Feb. 25, 2021

(65) Prior Publication Data
US 2022/0288718 A1  Sep. 15, 2022

(30) Foreign Application Priority Data
Aug. 20, 2019  (JP) .................. 2019-150688

(51) Int. Cl.
  *B23K 11/11*  (2006.01)
  *B23K 11/00*  (2006.01)
  (Continued)

(52) U.S. Cl.
CPC ......... *B23K 11/115* (2013.01); *B23K 11/0026* (2013.01); *B23K 11/241* (2013.01); *B23K 2101/18* (2018.08)

(58) Field of Classification Search
CPC . B23K 11/0026; B23K 11/115; B23K 11/241; B23K 11/257; B23K 2101/18; B23K 2103/04
(Continued)

(56) References Cited

U.S. PATENT DOCUMENTS

2010/0243616 A1\* 9/2010 Goto .............. B23K 11/115
                                                     219/119
2012/0129006 A1\* 5/2012 Kanai ............ B23K 11/312
                                                     428/683

FOREIGN PATENT DOCUMENTS

JP  H11-033736   2/1999
JP  2007-268604  10/2007
(Continued)

OTHER PUBLICATIONS

International Search Report, Date of mailing: Jun. 23, 2020, 2 pages.

*Primary Examiner* — Ibrahime A Abraham
*Assistant Examiner* — Joseph W Iskra
(74) *Attorney, Agent, or Firm* — Rankin, Hill & Clark LLP

(57) ABSTRACT

Provided is a spot welding method capable of reliably welding a metal sheet laminate while suppressing occurrence of expulsion. In the spot welding method, a pulse current is applied in a first current application step and a second current application step by a DC chopping control method. In the DC chopping control method, a pulse waveform of the pulse current is generated by switching between current application and current application stop to a pair of electrodes 12 and 22 by a current switch 28, a peak current value of the pulse current in the first current application step is set to a value A1 equal to that of the pulse current in the second current application step, and a power of the pulse (Continued)

current in the first current application step is set to a value larger than that of the pulse current in the second current application step.

12 Claims, 12 Drawing Sheets

(51) Int. Cl.
   *B23K 11/24* (2006.01)
   *B23K 101/18* (2006.01)
(58) Field of Classification Search
   USPC .................................................. 219/86.1
   See application file for complete search history.

(56) References Cited

FOREIGN PATENT DOCUMENTS

| | | |
|---|---|---|
| JP | 2010-082666 | 4/2010 |
| JP | 6315161 | 4/2018 |
| JP | 2019-051523 | 4/2019 |
| WO | 2018/123350 | 7/2018 |

* cited by examiner

FIG.8

| LOWER LIMIT VALUE (kA) OF PULSE CURRENT EFFECTIVE VALUE IN FIRST CURRENT APPLICATION STEP | LOWER LIMIT VALUE (kA) OF PULSE CURRENT EFFECTIVE VALUE IN SECOND CURRENT APPLICATION STEP | WELD DIAMETER (mm) ON FIRST METAL SHEET W1 SIDE |
|---|---|---|
| 11.63 | 6.61 | 5.35 |

FIG.9

| UPPER LIMIT VALUE (kA) OF PULSE CURRENT EFFECTIVE VALUE IN FIRST CURRENT APPLICATION STEP | UPPER LIMIT VALUE (kA) OF PULSE CURRENT EFFECTIVE VALUE IN SECOND CURRENT APPLICATION STEP | WELD DIAMETER (mm) ON FIRST METAL SHEET W1 SIDE |
|---|---|---|
| 12.79 | 7.68 | 6.3 |

FIG.10

| WIDTH (kA) OF PULSE CURRENT EFFECTIVE VALUE IN FIRST CURRENT APPLICATION STEP | WIDTH (kA) OF PULSE CURRENT EFFECTIVE VALUE IN SECOND CURRENT APPLICATION STEP |
|---|---|
| 1.16 | 1.07 |

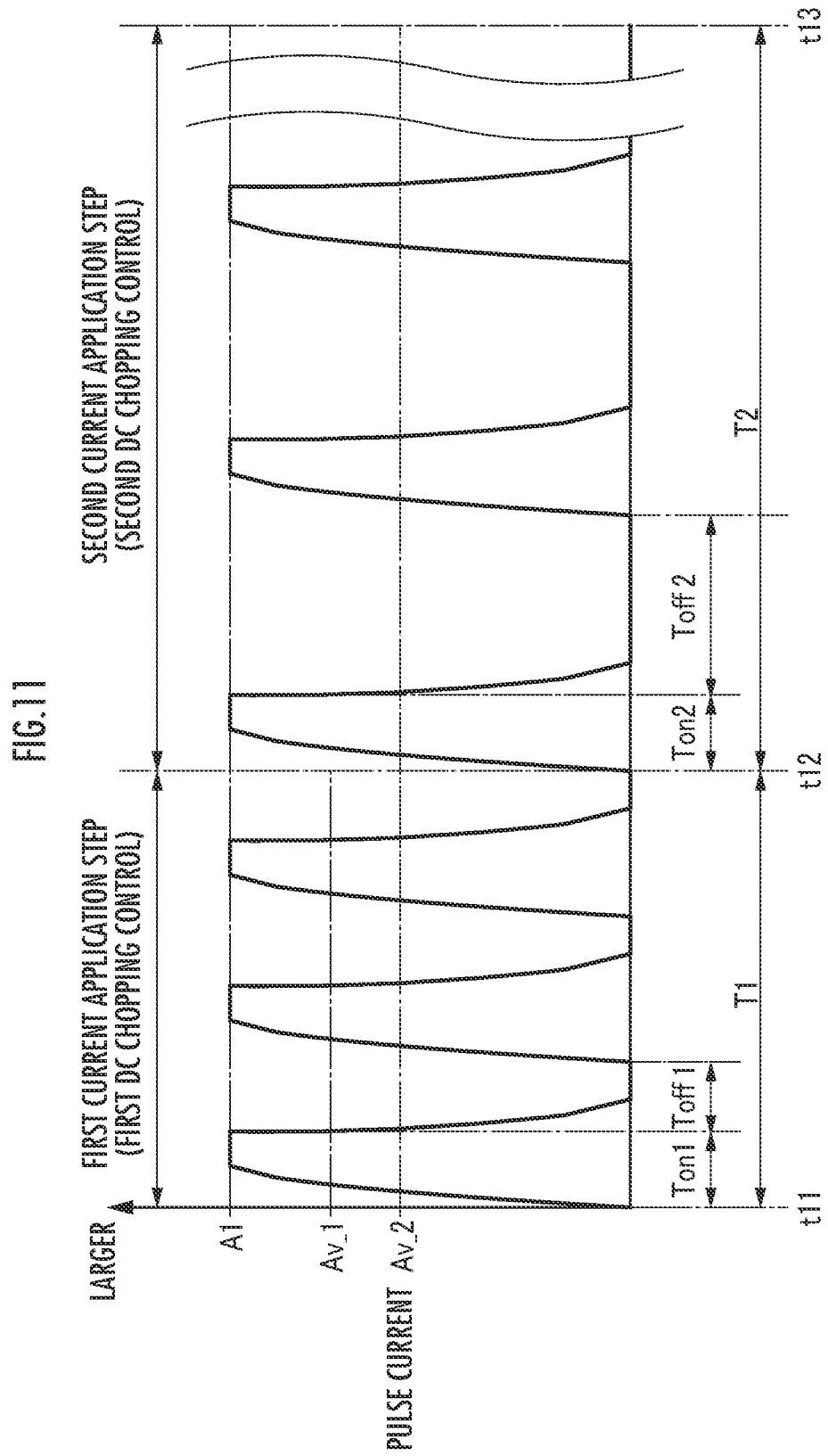

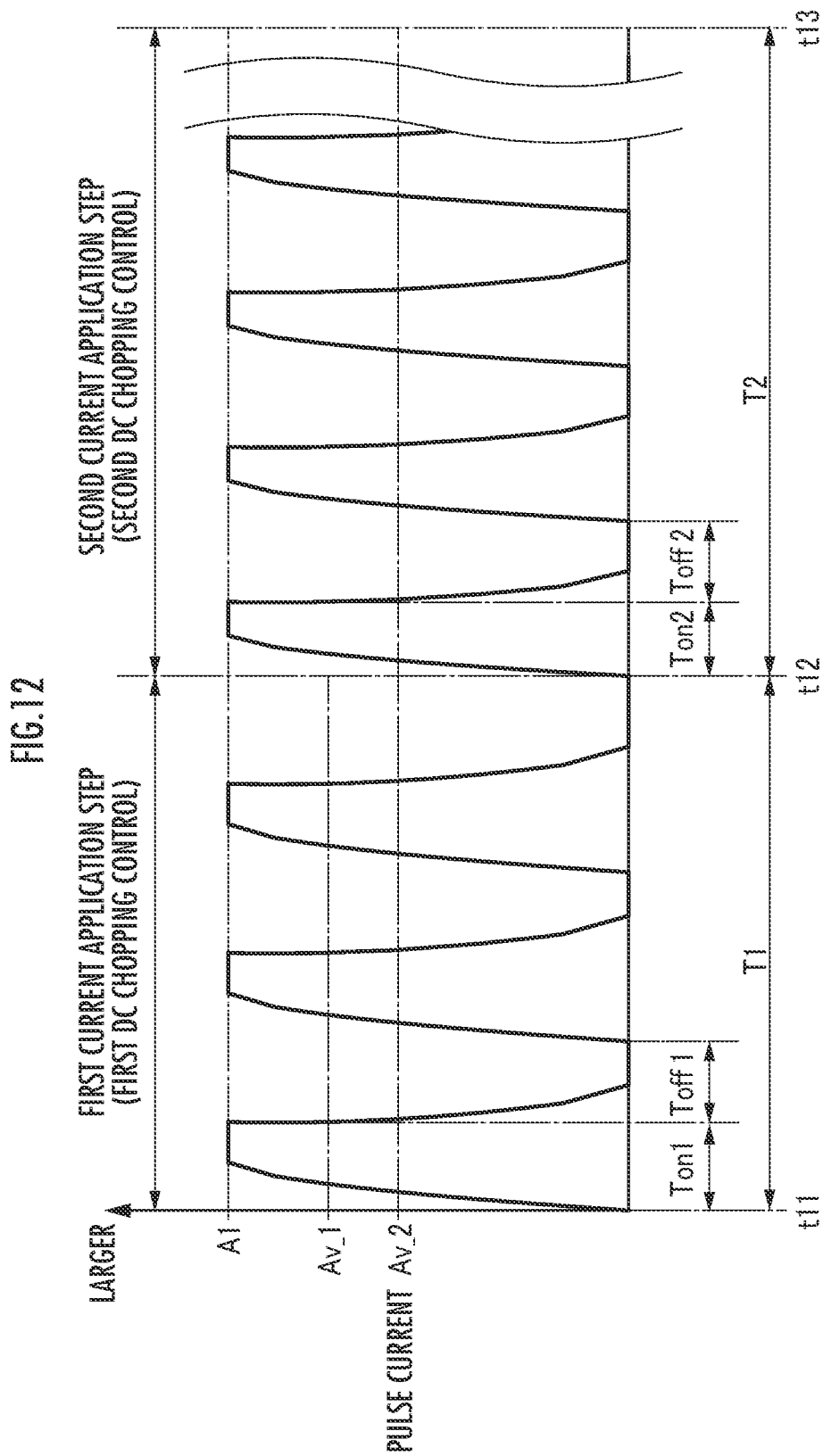

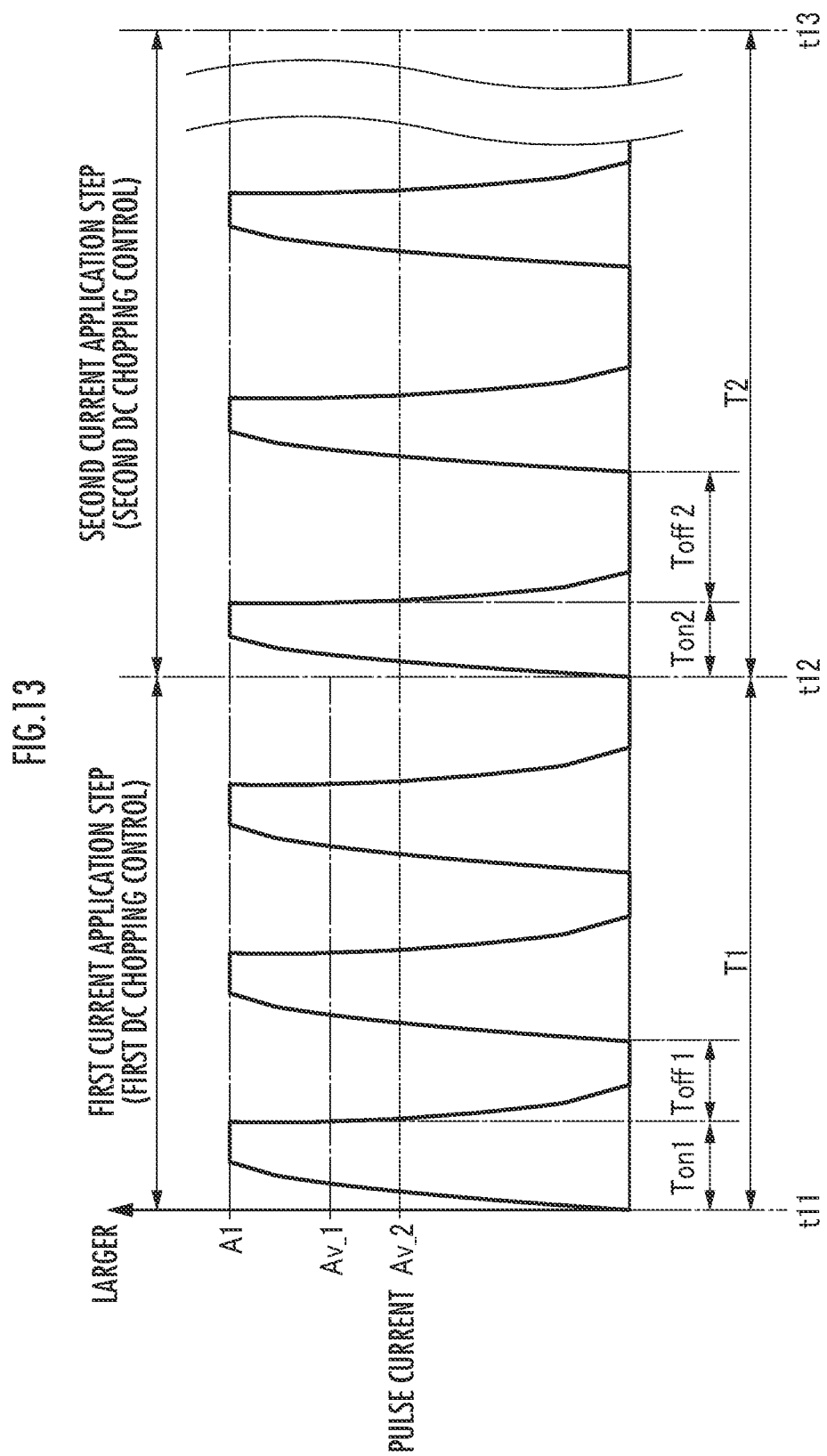

SPOT WELDING METHOD

TECHNICAL FIELD

The present invention relates to a spot welding method for welding a plurality of metal sheets.

BACKGROUND ART

When a plurality of metal sheets is welded, spot welding using a spot welding device is performed. In spot welding, in a state where a plurality of metal sheets is sandwiched between a pair of electrode tips, a current is applied between the pair of electrode tips to generate a nugget between the plurality of metal sheets, and the plurality of metal sheets is thereby welded.

In a spot welding method of Patent Literature 1, a current application step is executed in two stages of a main current application step and a post-current application step. In this main current application step, current application with a first current is executed to form a nugget portion. In addition, in the post-current application step, current application with a second current lower than the first current is executed in order to cool and solidify the nugget portion.

CITATION LIST

Patent Literature

Patent Literature 1: JP 6315161 B2

SUMMARY OF INVENTION

Technical Problem

In a case of the above spot welding method of Patent Literature 1, when a metal sheet laminate in which three or more metal sheets including at least one thin metal sheet and a metal sheet thicker than the thin metal sheet are laminated is welded, the following problems occur.

In a case of a spot welding method, it is known that it is necessary to ensure an appropriate current width of 1 kA or more during welding in order to obtain stable joining quality. This appropriate current width corresponds to a current width that can ensure stable joining quality. In the spot welding method of Patent Literature 1, in order to ensure such an appropriate current width of 1 kA or more, it is necessary to set a current application time of the main current application step to a predetermined time or more.

About this, in the case of the metal sheet laminate as described above, a nugget at a thick sheet-side boundary surface formed of a thick metal sheet starts to grow earlier and a growth rate itself is faster than a nugget at a thin sheet-side boundary surface formed of a thinner metal sheet. Therefore, as described above, when the current application time of the first current in the main current application step is set to be equal to or longer than the predetermined time, there is a possibility that the nugget at the thick sheet-side boundary surface grows too much and expulsion occurs during a period from when the nugget at the thin sheet-side boundary surface starts to grow until the nugget sufficiently grows.

Meanwhile, when the current application of the first current in the main current application step is set to be shorter than the predetermined time, there is a possibility that the nugget at the thin sheet-side boundary surface cannot grow to a sufficient size, and the metal sheet laminate is not welded. As described above, in the case of the spot welding method of Patent Literature 1, there is a problem that the above-described metal sheet laminate cannot be reliably welded while occurrence of expulsion is suppressed. In addition, since the current and the pressing force are simultaneously controlled, there is also a problem that it is difficult to set an appropriate condition for welding the metal sheet laminate.

The present invention has been made in order to solve the above problems, and an object of the present invention is to provide a spot welding method capable of reliably welding a metal sheet laminate while suppressing occurrence of expulsion.

Solution to Problem

In order to achieve the above object, an invention according to claim 1 is a spot welding method for disposing a metal sheet laminate formed by laminating three or more metal sheets such that at least one metal sheet of the three or more metal sheets is thinner than the other metal sheets between a pair of electrodes, and causing a pulse current to flow between the pair of electrodes to join the metal sheets, in which the pulse current is applied in a first current application step and a second current application step continuous with the first current application step and having a period longer than a period of the first current application step by a DC chopping control method, in the DC chopping control method, a pulse waveform of the pulse current is generated by switching between current application and current application stop to the pair of electrodes by a switching portion, a peak current value of the pulse current in the first current application step is set to a value equal to or larger than that of the pulse current in the second current application step, and a power of the pulse current in the first current application step is set to a value larger than that of the pulse current in the second current application step.

According to this spot welding method, the pulse current is applied in the first current application step and the second current application step continuous with the first current application step and having a period longer than a period of the first current application step by the DC chopping control method. Furthermore, in the DC chopping control method, a pulse waveform of the pulse current is generated by switching between current application and current application stop to the pair of electrodes by the switching portion, a peak current value of the pulse current in the first current application step is set to a value equal to or larger than that of the pulse current in the second current application step, and a power of the pulse current in the first current application step is set to a value larger than that of the pulse current in the second current application step. This makes it possible to sufficiently grow a nugget at a thin sheet-side boundary surface while suppressing occurrence of expulsion due to excessive growth of a nugget at a thick sheet-side boundary surface during the first current application step having a period shorter than a period of the second current application step.

Meanwhile, for the above reason, since the pulse current in the second current application step has a smaller power than the pulse current in the first current application step, the nugget at the thick sheet-side boundary surface can be sufficiently grown during the second current application step having a period longer than a period of the first current application step. As described above, the metal sheet laminate can be reliably welded while occurrence of expulsion is suppressed. In addition, unlike the case of Patent Literature 1, it is only required to control a current. Therefore, appropriate conditions for welding the metal sheet laminate can be easily set.

An invention according to claim 2 is the spot welding method according to claim 1, in which the peak current value of the pulse current in the first current application step is set to a value equal to that of the pulse current in the second current application step, a current application time for generating the pulse waveform for one pulse in the pulse current in the first current application step is set to a value equal to that in the pulse current in the second current application step, and a current application stop time for generating the pulse waveform for one pulse in the pulse current in the first current application step is set to a value smaller than that in the pulse current in the second current application step.

According to this spot welding method, a peak current value of the pulse current in the first current application step is set to a value equal to a peak current value of the pulse current in the second current application step. Furthermore, a current application time for generating the pulse waveform for one pulse in the pulse current in the first current application step is set to a value equal to that in the pulse current in the second current application step, and a current application stop time for generating the pulse waveform for one pulse in the pulse current in the first current application step is set to a value smaller than that in the pulse current in the second current application step. Therefore, during DC chopping control, by switching only the current application stop time for forming the pulse waveform for one pulse to a larger value, the process can be shifted from the first current application step to the second current application step, and controllability can be improved.

An invention according to claim 3 is the spot welding method according to claim 1, in which the peak current value of the pulse current in the first current application step is set to a value equal to that of the pulse current in the second current application step, a current application time for generating the pulse waveform for one pulse in the pulse current in the first current application step is set to a value larger than that in the pulse current in the second current application step, and a current application stop time for generating the pulse waveform for one pulse in the pulse current in the first current application step is set to a value equal to or smaller than that in the pulse current in the second current application step.

According to this spot welding method, a peak current value of the pulse current in the first current application step is set to a value equal to a peak current value of the pulse current in the second current application step. Furthermore, a current application time for generating the pulse waveform for one pulse in the pulse current in the first current application step is set to a value larger than that in the pulse current in the second current application step, and a current application stop time for generating the pulse waveform for one pulse in the pulse current in the first current application step is set to a value equal to or smaller than that in the pulse current in the second current application step. Therefore, in the pulse current in the first current application step, when the current application stop time for generating the pulse waveform for one pulse is set to a value equal to that of the pulse current in the second current application step, during DC chopping control, by switching only the current application time for forming the pulse waveform for one pulse to a smaller value, the process can be shifted from the first current application step to the second current application step, and controllability can be improved.

Furthermore, in the pulse current in the first current application step, when the current application stop time for generating the pulse waveform for one pulse is set to a value smaller than that of the pulse current in the second current application step, during DC chopping control, by switching the current application time for forming the pulse waveform for one pulse to a smaller value and switching the current application stop time to a larger value, the process can be shifted from the first current application step to the second current application step.

An invention according to claim 4 is the spot welding method according to claim 1, in which the peak current value of the pulse current in the first current application step is set to a value equal to that of the pulse current in the second current application step, and a current application time and a current application stop time for generating the pulse waveform for one pulse in the pulse current in the first current application step are set to values smaller than those in the pulse current in the second current application step.

According to this spot welding method, a peak current value of the pulse current in the first current application step is set to a value equal to a peak current value of the pulse current in the second current application step. Furthermore, since a current application time and a current application stop time for generating the pulse waveform for one pulse in the pulse current in the first current application step are set to values smaller than those in the pulse current in the second current application step, during DC chopping control, by switching both the current application time and the current application stop time for forming the pulse waveform for one pulse to larger values, the process can be shifted from the first current application step to the second current application step.

An invention according to claim 5 is the spot welding method according to claim 1, in which the pulse current has a pulse waveform that periodically repeats a state in which the pulse current reaches a peak current value that is an upper limit value of a preset peak current range from a value lower than a lower limit value of the peak current range, then falls from the peak current value to the lower limit value of the peak current range, rises again to the peak current value, and falls from the peak current value to a value lower than the lower limit value of the peak current range.

According to a test of the present applicant, it has been confirmed that, in executing the DC chopping control, when the lengths of the first current application step and the second current application step and the current application stop time of the pulse current are set as described above, and the pulse waveform is set as described above, the metal sheet laminate can be reliably welded while occurrence of expulsion is suppressed (data is not illustrated). Therefore, according to this spot welding method, a yield during spot welding can be improved.

An invention according to claim 6 is the spot welding method according to claim 1, in which the pulse current has a pulse waveform that periodically repeats a state in which the pulse current reaches a preset peak current value from a value lower than the peak current value, then falls from the peak current value to a value lower than the peak current value, and rises again to the peak current value.

According to a test of the present applicant, it has been confirmed that, in executing the DC chopping control, when the lengths of the first current application step and the second current application step and the current application stop time of the pulse current are set as described above, and the pulse waveform is set as described above, the metal sheet laminate can be reliably welded while occurrence of expulsion is suppressed (see FIGS. 8 and 9 described later). Therefore, according to this spot welding method, a yield during spot welding can be improved.

An invention according to claim 7 is the spot welding method according to any one of claims 1 to 6, in which the metal sheet laminate is formed such that a sheet thickness ratio, which is a ratio of the total thickness of the three or more metal sheets to the thickness of the at least one metal sheet, is 3.5 or more.

According to a test of the present applicant, it has been confirmed that, in a case where the metal sheet laminate having the sheet thickness ratio as described above is spot-welded, when the first current application step and the second current application step are set as described above, and the current application stop time for forming the waveform for one pulse of the pulse current in each of these steps is set as described above, an appropriate current width of 1 kA or more can be ensured (see FIG. 10 described later). Therefore, according to this spot welding method, even under a condition that the pulse current temporarily varies in a welding site, the metal sheet laminate can be reliably welded while an influence of the variation is avoided and occurrence of expulsion is suppressed. As a result, a yield can be improved.

BRIEF DESCRIPTION OF DRAWINGS

FIG. 8 is a diagram illustrating an example of test data of the spot welding method of the first embodiment.

FIG. 9 is a diagram illustrating another example of test data of the spot welding method of the first embodiment.

FIG. 10 is a diagram illustrating a width of a pulse current effective value in the test data of FIGS. 8 and 9.

FIG. 11 is a timing chart illustrating a pulse waveform during execution of a spot welding process according to a second embodiment.

FIG. 12 is a timing chart illustrating a pulse waveform during execution of a spot welding process according to a third embodiment.

FIG. 13 is a timing chart illustrating a pulse waveform during execution of a spot welding process according to a fourth embodiment.

DESCRIPTION OF EMBODIMENTS

Figure 1:
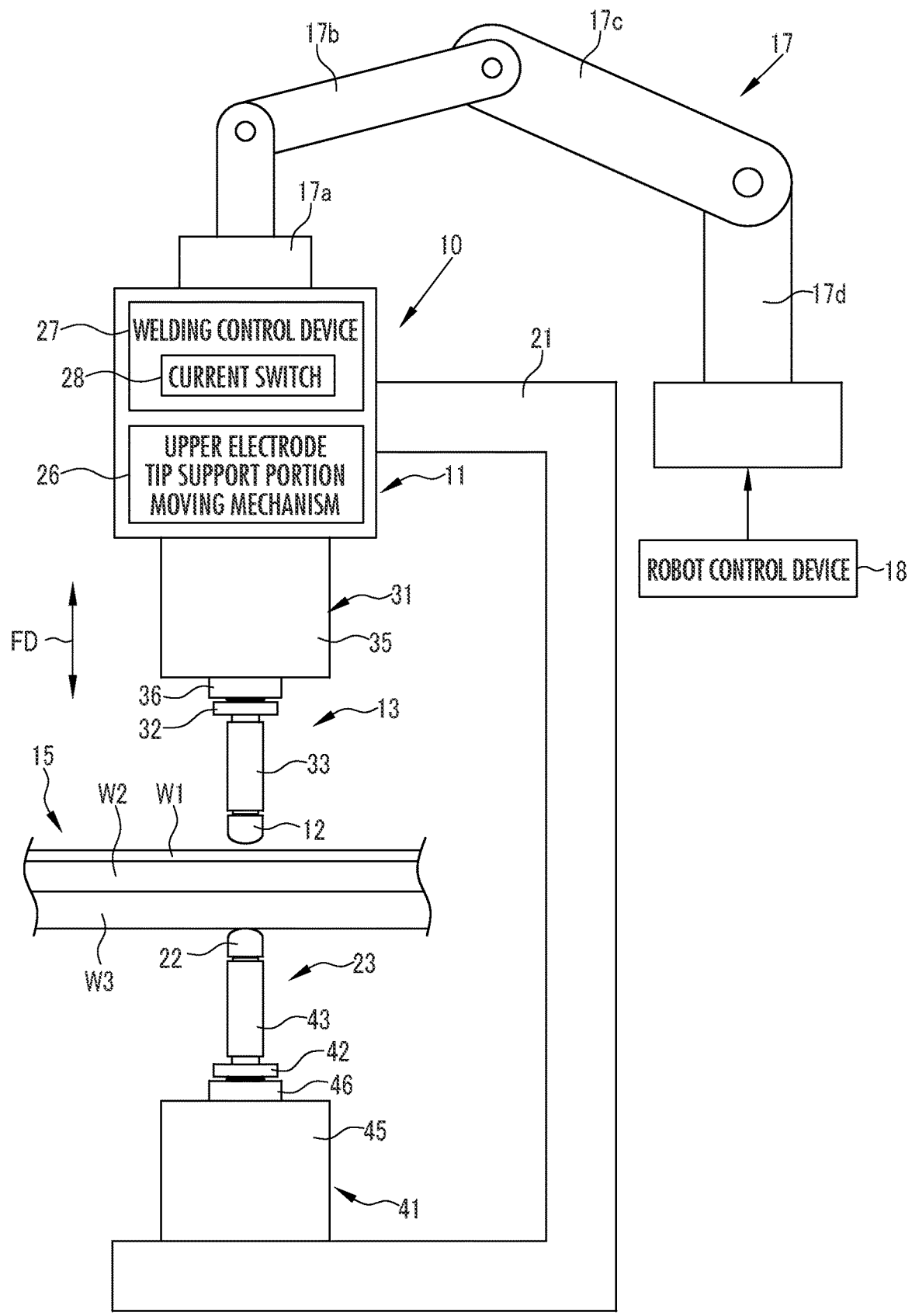
FIG. 1 is a front view illustrating a spot welding device that executes a spot welding method according to a first embodiment of the present invention.

Hereinafter, a spot welding method according to a first embodiment of the present invention will be described with reference to the drawings. As illustrated in FIG. 1, a spot welding device 10 that executes the spot welding method of the present embodiment is constituted by a welding gun, and includes a gun body 11, an upper electrode tip 12, and an upper electrode tip support portion 13 that supports the upper electrode tip 12.

The spot welding device 10 joins a metal sheet laminate 15 including a first metal sheet W1, a second metal sheet W2, and a third metal sheet W3 used in a vehicle. In the metal sheet laminate 15, the first metal sheet W1 is thinner than the second and third metal sheets W2 and W3, and a sheet thickness ratio of the total thickness of the metal sheet laminate 15 to the thickness of the first metal sheet W1 is 3.5 or more, and more preferably 3.5 to 10.

The gun body 11 is attached to a first arm 17a of a robot 17. The robot 17 is, for example, a multi-axis articulated robot, and includes first to fourth arms 17a to 17d in order from a distal end thereof.

The robot 17 includes a plurality of motors (not illustrated) that drives the arms 17a to 17d, and a robot control device 18 drives these motors to control an operation of the robot 17. Note that a base portion of the robot 17 is supported by the ground, a pedestal (not illustrated) fixed to the ground, or the like.

The robot control device 18 drives the plurality of motors of the robot 17 and drives the arms 17a to 17d to control the position and orientation of the gun body 11 attached to the arm 17a, and thereby moves the gun body 11 to a joint portion of the first to third metal sheets W1 to W3.

The gun body 11 is attached to a gun arm 21. A lower electrode tip 22 is attached to a distal end portion of a lower portion of the gun arm 21 via a lower electrode tip support portion 23. The upper electrode tip 12 and the lower electrode tip 22 face each other in the vertical direction.

The gun body 11 includes an upper electrode tip support portion moving mechanism 26 that moves the upper electrode tip support portion 13 in the vertical direction, and a welding control device 27 that integrally controls the spot welding device 10. The welding control device 27 includes a current switch 28 for allowing a current to flow (applying a current) between the upper electrode tip 12 and the lower electrode tip 22. When the current switch 28 is on, a current flows between the upper electrode tip 12 and the lower electrode tip 22. Operating states of the upper electrode tip 12, the lower electrode tip 22, the upper electrode tip support portion moving mechanism 26, the current switch 28, and the like are controlled by the welding control device 27.

Figure 2:
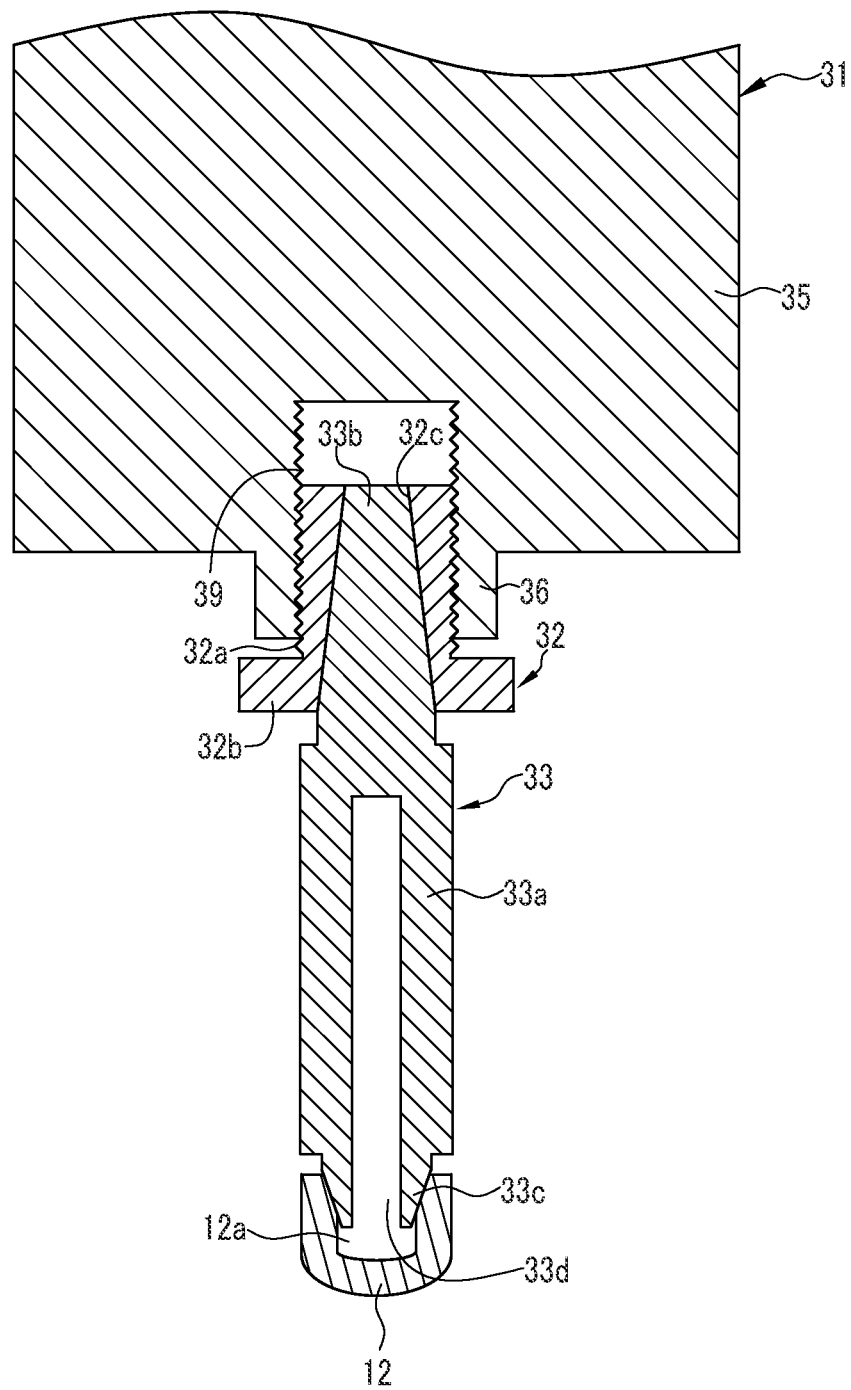
FIG. 2 is a cross-sectional view illustrating an upper electrode tip and an upper electrode tip support portion.

As illustrated in FIGS. 1 and 2, the upper electrode tip support portion 13 includes an upper adapter body 31 attached to the gun body 11, an upper screw adapter 32 attached to the upper adapter body 31, and an upper shank 33 attached to the upper screw adapter 32. The upper adapter body 31 is moved in the vertical direction by the upper electrode tip support portion moving mechanism 26 disposed in the gun body 11.

The upper adapter body 31 includes a cylindrical upper adapter body portion 35 and a cylindrical upper adapter protrusion 36 protruding downward from a lower surface of the upper adapter body portion 35.

At the center of a lower surface of the upper adapter protrusion 36, an upper screw hole 39 that is threaded so as to be continuous with the inside of the upper adapter body portion 35 is formed.

The upper screw adapter 32 includes an upper screw portion 32a whose outer periphery is threaded and an upper screw flange portion 32b. An upper shank attachment hole 32c is formed in the upper screw adapter 32. The upper shank attachment hole 32c penetrates the upper screw adapter 32 in the vertical direction and is formed in a tapered shape such that the diameter thereof decreases upward.

The upper screw portion 32a of the upper screw adapter 32 is screwed into the upper screw hole 39 of the upper adapter body 31, and the upper screw adapter 32 is attached to the upper adapter body 31.

The upper shank 33 includes an upper shank body portion 33a, an upper shank attachment portion 33b press-fitted into the upper shank attachment hole 32c, an upper electrode tip attachment portion 33c, and an upper shank recess 33d. The upper shank recess 33d is formed in the upper shank 33 so as to be continuous with the upper electrode tip attachment portion 33c and the upper shank body portion 33a.

The upper shank attachment portion 33b is formed in a tapered shape along the tapered upper shank attachment hole 32c.

The upper shank attachment portion 33b of the upper shank 33 is press-fitted into the upper shank attachment hole 32c of the upper screw adapter 32, and the upper shank 33 is thereby attached to the upper screw adapter 32.

The upper electrode tip attachment portion 33c is formed in a tapered shape such that the diameter thereof decreases downward. An upper electrode tip recess 12a is formed in the upper electrode tip 12, and the upper electrode tip recess 12a has a tapered portion along the tapered upper electrode tip attachment portion 33c.

The upper electrode tip attachment portion 33c of the upper shank 33 is press-fitted into the upper electrode tip recess 12a of the upper electrode tip 12, and the upper electrode tip 12 is thereby attached to the upper shank 33.

Figure 3:
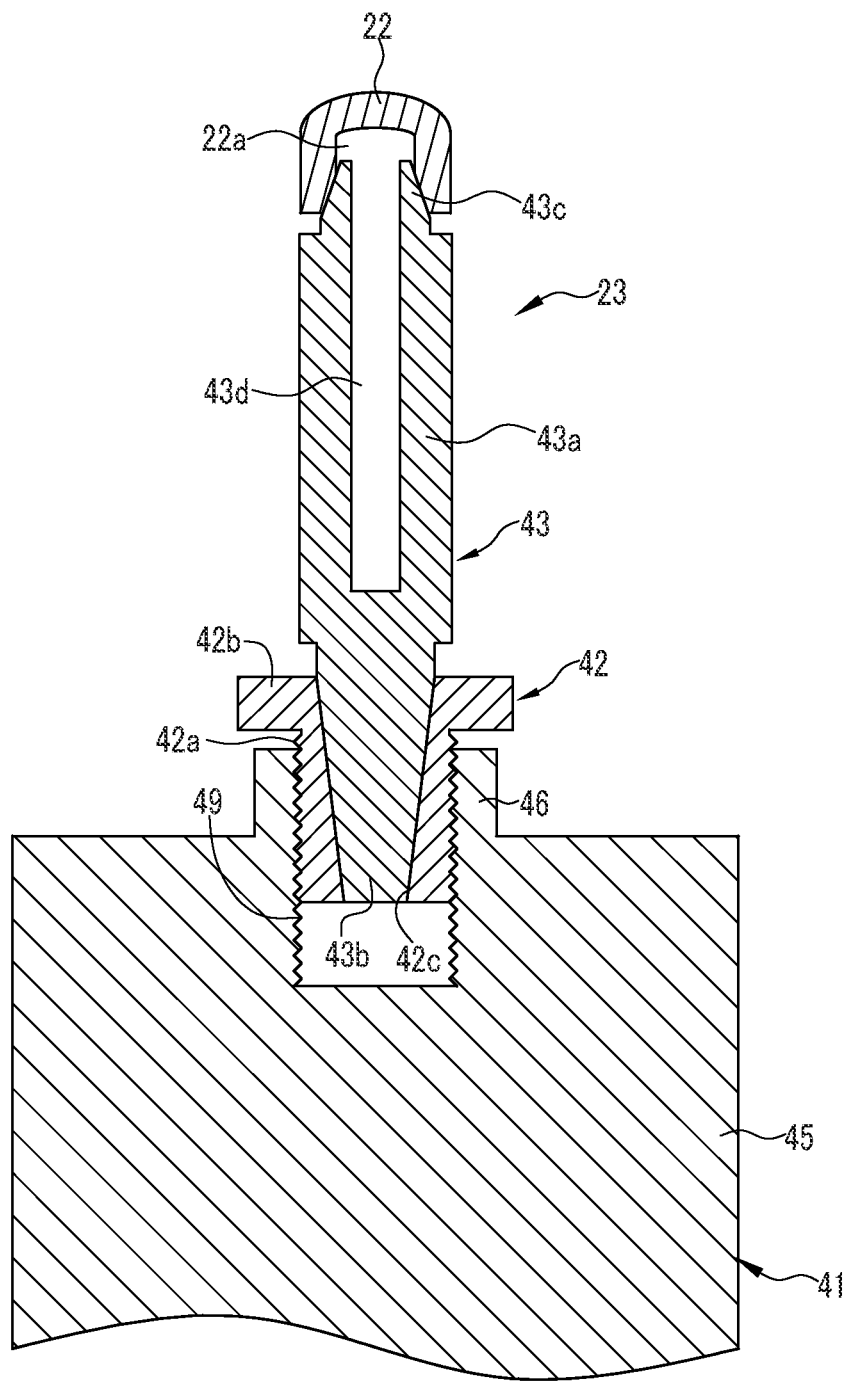
FIG. 3 is a cross-sectional view illustrating a lower electrode tip and a lower electrode tip support portion.

As illustrated in FIG. 3, the lower electrode tip support portion 23 includes a lower adapter body 41, a lower screw adapter 42, and a lower shank 43. Similarly to the upper adapter body 31, the lower adapter body 41 includes a cylindrical lower adapter body portion 45 and a cylindrical lower adapter protrusion 46 protruding upward from an upper surface of the lower adapter body portion 45.

At the center of a lower surface of the lower adapter protrusion 46, a lower screw hole 49 that is threaded so as to be continuous with the inside of the lower adapter body portion 45 is formed.

The lower screw adapter 42 is formed in the same shape as the upper screw adapter 32, and includes a lower screw portion 42a and a lower screw flange portion 42b. A tapered lower shank attachment hole 42c is formed in the lower screw adapter 42.

The lower screw portion 42a of the lower screw adapter 42 is screwed into the lower screw hole 49 of the lower adapter body 41, and the lower screw adapter 42 is thereby attached to the lower adapter body 41.

The lower shank 43 is formed in the same shape as the upper shank 33, and includes a lower shank body portion 43a, a tapered lower shank attachment portion 43b, a tapered lower electrode tip attachment portion 43c, and a lower shank recess 43d. The lower shank recess 43d is formed in the lower shank 43 so as to be continuous with the lower electrode tip attachment portion 43c and the lower shank body portion 43a.

The lower shank attachment portion 43b of the lower shank 43 is press-fitted into the lower shank attachment hole 42c of the lower screw adapter 42, and the lower shank 43 is thereby attached to the lower screw adapter 42.

A lower electrode tip recess 22a is formed in the lower electrode tip 22, and the lower electrode tip recess 22a has a tapered portion along the tapered lower electrode tip attachment portion 43c.

The lower electrode tip attachment portion 43c of the lower shank 43 is press-fitted into the lower electrode tip recess 22a of the lower electrode tip 22, and the lower electrode tip 22 is thereby attached to the lower shank 43.

Next, a spot welding method of the first to third metal sheets W1 to W3 with the spot welding device 10 will be described. In this case, since the first to third metal sheets W1 to W3 are welded in a laminated state, a laminate of the first to third metal sheets W1 to W3 is referred to as "metal sheet laminate W1 to W3" in the following description.

First, as illustrated in FIG. 1, the robot control device 18 drives the plurality of motors of the robot 17 to drive the arms 17a to 17d, and thereby moves the spot welding device 10 to a position where the metal sheet laminate W1 to W3 is disposed between the upper electrode tip 12 and the lower electrode tip 22. At this time, the lower electrode tip 22 comes into contact with a lower surface of the third metal sheet W3.

Figure 4:
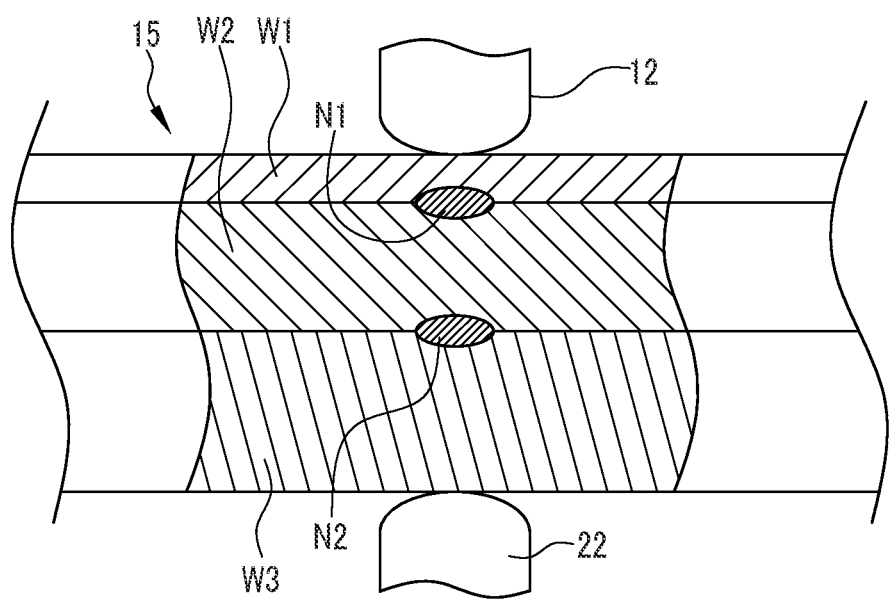
FIG. 4 is a partially broken view of first to third metal sheets during spot welding.

Next, as illustrated in FIG. 4, the welding control device 27 of the spot welding device 10 drives the upper electrode tip support portion moving mechanism 26 to move the upper electrode tip support portion 13 downward.

As a result, the upper electrode tip 12 moves downward and comes into contact with an upper surface of the first metal sheet W1. As a result, the metal sheet laminate W1 to W3 is pressed and sandwiched between the upper electrode tip 12 and the lower electrode tip 22. Note that in the present embodiment, the upper electrode tip 12 and the lower electrode tip 22 correspond to a pair of electrodes.

Next, the welding control device 27 turns on the current switch 28 to allow a current to flow (apply a current) between the upper electrode tip 12 and the lower electrode tip 22 in a state where the metal sheet laminate W1 to W3 is pressed and sandwiched between the upper electrode tip 12 and the lower electrode tip 22. By this current application, a first nugget N1 is formed between the first metal sheet W1 and the second metal sheet W2, a second nugget N2 is formed between the second metal sheet W2 and the third metal sheet W3, and the metal sheet laminate W1 to W3 is welded.

Next, a spot welding method with the welding control device 27 of the present embodiment will be described. The welding control device 27 executes spot welding by DC chopping control, and an operation of the DC chopping control will be described below with reference to FIG. 5. Note that the unit of a current value is kA, and the unit of time is msec in the description of FIG. 5.

Figure 5:
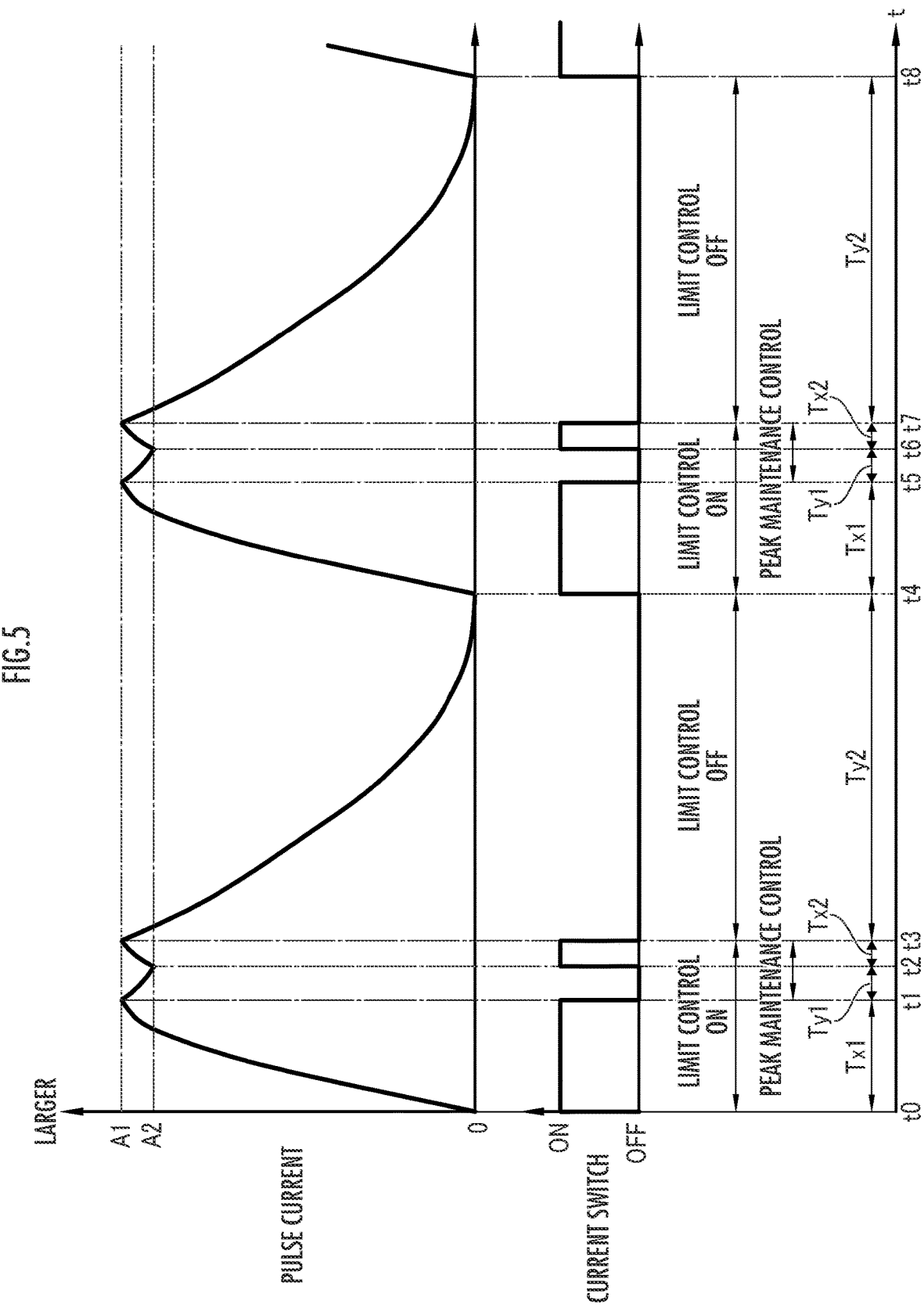
FIG. 5 is a timing chart illustrating a pulse waveform of a current flowing between a upper electrode tip and a lower electrode tip during execution of DC chopping control.

As illustrated in FIG. 5, the DC chopping control is executed by switching between execution and stop (that is, ON and OFF) of limit control of a pulse current by turning on or off the current switch 28. As a result, a DC chopping pulse current (hereinafter, simply referred to as "pulse current") having the pulse waveform illustrated in FIG. 5 is applied between the upper electrode tip 12 and the lower electrode tip 22.

This limit control changes the pulse current as illustrated in FIG. 5. First, at time t0, the current switch 28 is turned on in a state where the pulse current has a value 0 (bottom current), a current is applied between the upper electrode tip 12 and the lower electrode tip 22, and the limit control is thereby turned on.

Then, at a timing (time t1) when a first current application time Tx1 has elapsed after the current switch 28 is turned on and the pulse current reaches a peak current value A1, the current switch 28 is turned off.

Subsequently, at a timing (time t2) when a first current application stop time Ty1 has elapsed after the current switch 28 is turned off and the pulse current has fallen to a lower limit peak current value A2 (unit: kA) smaller than the peak current value A1, the current switch 28 is turned on.

Thereafter, at a timing (time t3) when a second current application time Tx2 has elapsed after the current switch 28 is turned on and the pulse current has reached the peak current value A1 again, the current switch 28 is turned off and the limit control is turned off. In this case, a control process during the above period from time t1 to t3, that is, a control process in which the pulse current reaches the lower limit peak current value A2 from the peak current value A1 and then rises again to the peak current value A1 is referred to as peak maintenance control, and a period from time t1 to t3 (Ty1+Tx2) is referred to as a peak duration.

Subsequently, at a timing (time t4) when a second current application stop time Ty2 has elapsed after the limit control is turned off and the pulse current has become a value 0, the current switch 28 is turned on and the limit control is turned on. Then, during a period from t5 to t8 after that, a control process similar to that described above is executed.

In the DC chopping control described above, the peak current value A1 is set to, for example, a value of 10.6 kA or more, and the lower limit peak current value A2 is set to, for example, a value of 90% of the peak current value A1. Note that in the present embodiment, the peak current value A1 corresponds to an upper limit value of a peak current range, and the lower limit peak current value A2 corresponds to a lower limit value of the peak current range. Furthermore, the peak duration (Ty1+Tx2) is set to, for example, 0.9 msec.

Note that the DC chopping control method described above is an example in which the peak maintenance control process is executed once during one peak duration, but the peak maintenance control process may be executed twice or more during one peak duration.

Furthermore, the peak duration (Ty1+Tx2) may be set to a value 0 such that the peak maintenance control process is not executed. That is, at a timing when the first current application stop time Ty1 has elapsed after the current switch 28 is switched from OFF to ON and the limit control is switched from OFF to ON, and the pulse current reaches the peak current value A1, the current switch 28 may be switched from ON to OFF and the limit control may be turned off.

Next, a spot welding control processing of the present embodiment will be described with reference to FIG. 6. This spot welding control process spot-welds the metal sheet laminate W1 to W3 by the above-described DC chopping control method, and is executed at a predetermined control cycle by the welding control device 27.

Figure 6:
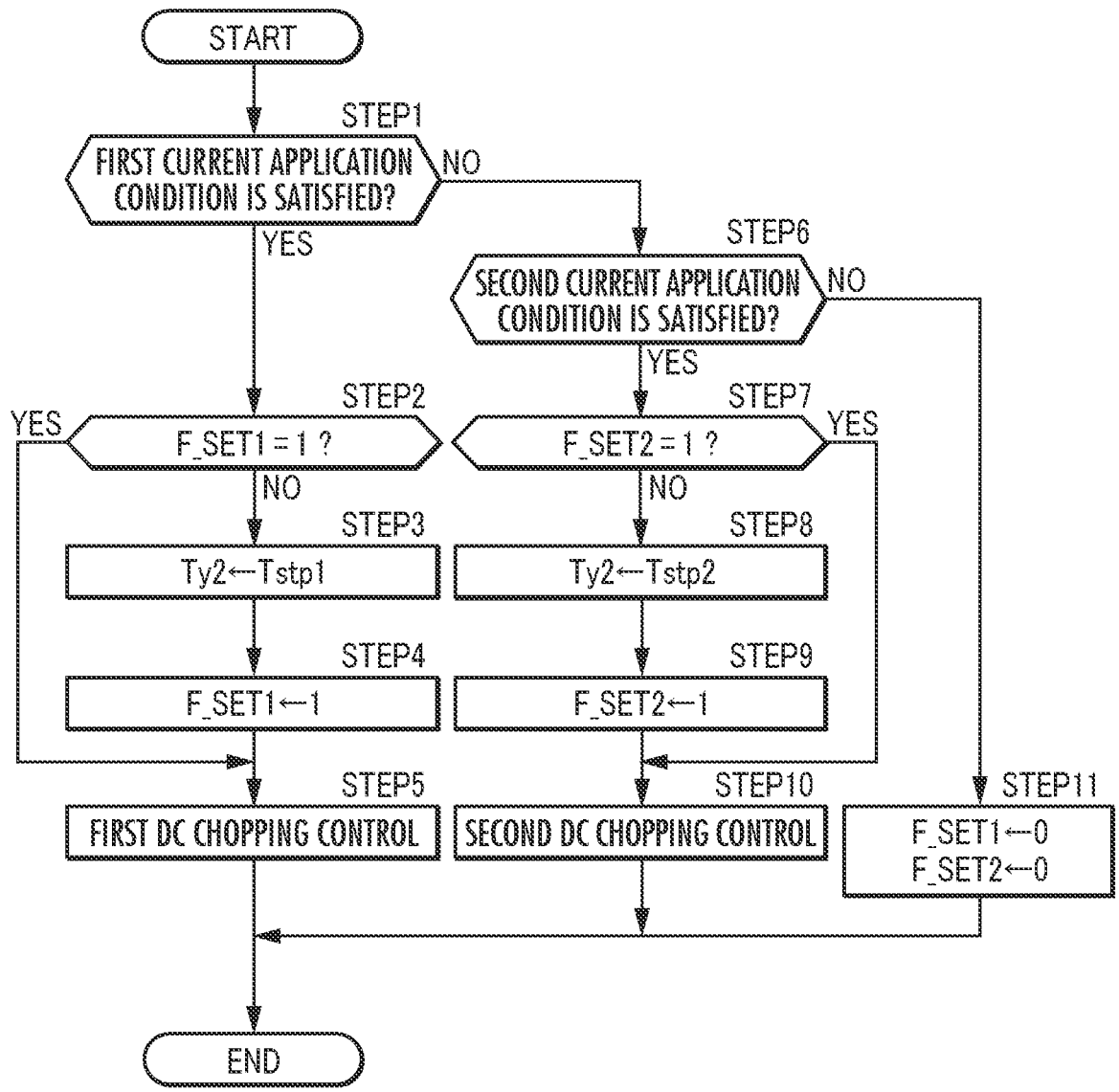
FIG. 6 is a flowchart illustrating a spot welding control process.

As illustrated in FIG. 6, first, it is determined whether or not a first current application condition is satisfied (FIG. 6/STEP 1). This first current application condition is an execution condition of the first current application step. Specifically, when all of the following three conditions (f1) to (f3) are satisfied, it is determined that the first current application condition is satisfied, and otherwise, it is determined that the first current application condition is not satisfied. The first current application step is a step of executing a first DC chopping control described later.

(f1) The welding gun of the spot welding device 10 has moved to the current welding position after spot welding at the previous welding position is ended.

(f2) The first current application step has not been executed at the current welding position.

(f3) A first process time T1 (see FIG. 7) has not elapsed from the start of the first current application step at the current welding position.

If this determination is affirmative (FIG. 6/STEP 1 . . . YES) and the first current application condition is satisfied, it is determined whether or not a first time set flag F_SET1 is "1" (FIG. 6/STEP 2).

If this determination is negative (FIG. 6/STEP 2 . . . NO), the second current application stop time Ty2 is set to a predetermined first stop time Tstp1 (FIG. 6/STEP 3). Subsequently, in order to represent that the second current application stop time Ty2 is set to the predetermined first stop time Tstp1, the first time set flag F_SET1 is set to "1" (FIG. 6/STEP 4).

If the second current application stop time Ty2 is set to the predetermined first stop time Tstp1 as described above, or if the determination described above is affirmative (FIG. 6/STEP 2 . . . YES) and the second current application stop time Ty2 is set to the predetermined first stop time Tstp1 at a control timing before the previous time, next, the first DC chopping control is executed (FIG. 6/STEP 5).

In the first DC chopping control, the ON or OFF state of the current switch 28 is controlled as described below during the first current application step, that is, from the control start timing until the above-described first process time T1 elapses. Specifically, the ON or OFF state of the current switch 28 is controlled such that the first current application time Tx1, the first current application stop time Ty1, and the second current application time Tx2 described above are three predetermined values, and the second current application stop time Ty2 is the predetermined first stop time Tstp1. As described above, after the first DC chopping control is executed, this process is ended.

Meanwhile, if the determination described above is negative (FIG. 6/STEP 1 . . . NO) and the first current application condition is not satisfied, it is determined whether or not a second current application condition is satisfied (FIG. 6/STEP 6). This second current application condition is an execution condition of the second current application step. Specifically, when both of the following two conditions (f4) and (f5) are satisfied, it is determined that the second current application condition is satisfied, and otherwise, it is determined that the second current application condition is not satisfied. The second current application step is a step of executing a second DC chopping control described later.

(f4) The first current application step has been executed and the second current application step has not been executed at the current welding position.

(f5) A second process time T2 (see FIG. 7) has not elapsed from the start of the second current application step at the current welding position.

If this determination is affirmative (FIG. 6/STEP 6 . . . YES) and the second current application condition is satisfied, it is determined whether or not a second time set flag F_SET2 is "1" (FIG. 6/STEP 7).

If this determination is negative (FIG. 6/STEP 7 . . . NO), the second current application stop time Ty2 is set to a predetermined second stop time Tstp2 (FIG. 6/STEP 8). This second stop time Tstp2 is set to a value that satisfies Tstp1<Tstp2.

Subsequently, in order to represent that the second current, application stop time Ty2 is set to the predetermined second stop time Tstp2, the second time set flag F_SET2 is set to "1" (FIG. 6/STEP 9).

If the second current application stop time Ty2 is set to the predetermined second stop time Tstp2 as described above, or if the determination described above is affirmative (FIG.

6/STEP 7 . . . YES) and the second current application stop time Ty2 is set to the predetermined second stop time Tstp2 at a control timing before the previous time, next, the second DC chopping control is executed (FIG. 6/STEP 10).

In the second DC chopping control, the ON or OFF state of the current switch 28 is controlled as described below during the second current application step, that is, from the control start timing until the above-described second process time T2 elapses. Specifically, the ON or OFF state of the current switch 28 is controlled such that the first current application time Tx1, the first current application stop time Ty1, and the second current application time Tx2 described above are equal values to those in the first DC chopping control, and the second current application stop time Ty2 is the predetermined second stop time Tstp2. As described above, after the second DC chopping control is executed, this process is ended.

Meanwhile, if the determination described above is negative (FIG. 6/STEP 6 . . . NO) and both the first current application condition and the second current application condition are not satisfied, both of the two flags F_SET1 and F_SET2 described above are reset to "0" (FIG. 6/STEP 11), and this process is ended.

Figure 7:
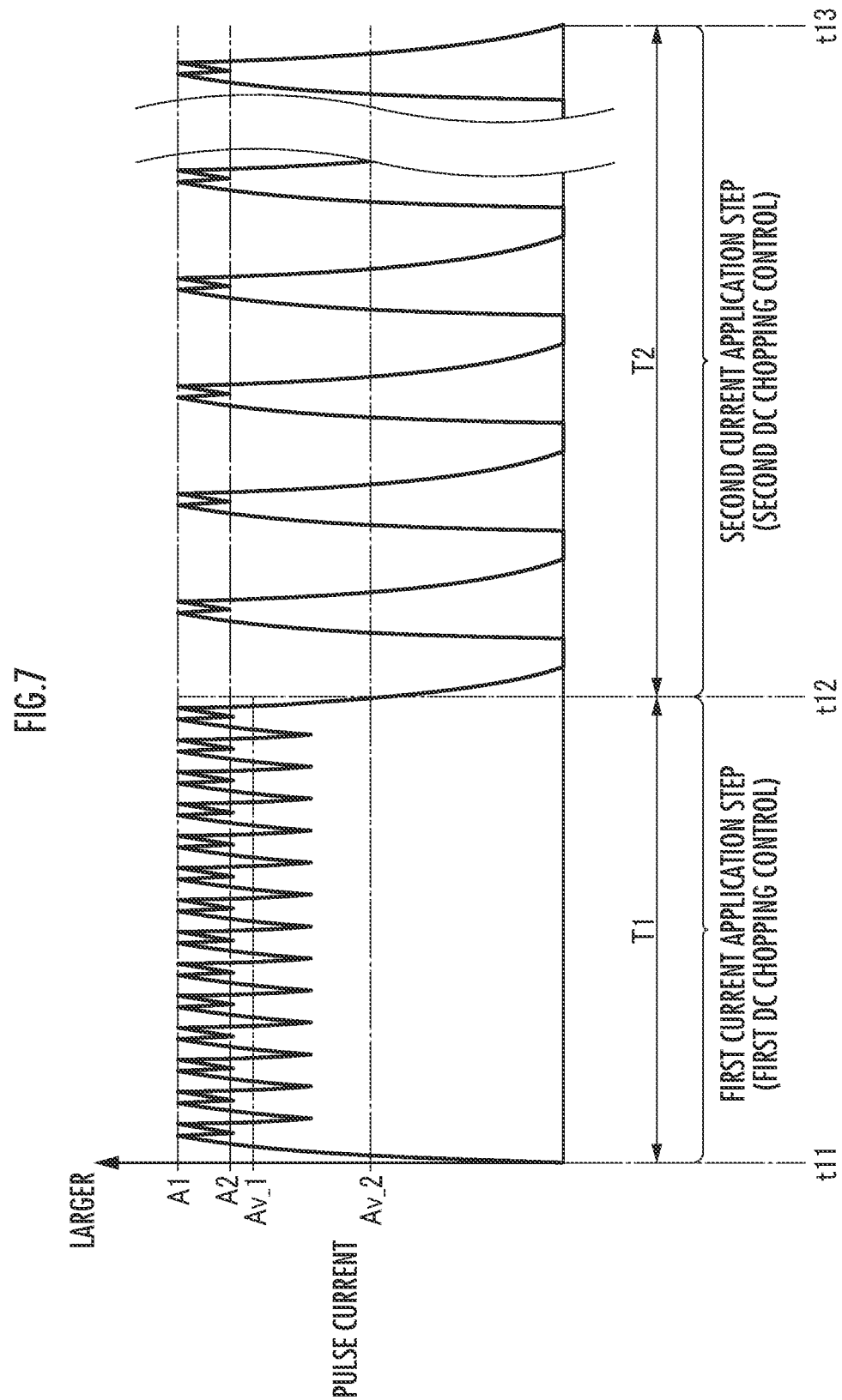
FIG. 7 is a timing chart illustrating a pulse waveform during execution of the spot welding control process.

Next, a transition of the pulse current when the spot welding control process of FIG. 6 is executed as described above will be described with reference to FIG. 7. As illustrated in FIG. 7, first, at a timing (time t11) when the first current application condition is satisfied, the first current application step is started and the first DC chopping control is started.

Then, with a progress of the control, a timing (time t12) when the first process time T1 has elapsed, the first current application step is ended and the first DC chopping control is ended, and simultaneously, the second current application condition is satisfied. The second current application step is thereby started and the second DC chopping control is started. Thereafter, with a progress of the control, at a timing (time t13) when the second process time T2 has elapsed, the second current application step is ended and the second DC chopping control is ended.

Then, although not illustrated, the pulse current is maintained at a value 0 until the welding gun of the spot welding device 10 moves from the current welding position to a next welding position, and at a timing when the spot welding device 10 reaches the next welding position, the first current application step is started as described above.

In addition, as illustrated in FIG. 7, when the spot welding control process of the present embodiment is executed, the pulse current in the first current application step is shifted in a pulse waveform at a higher frequency than the pulse current in the second current application step. This is for the following reason.

That is, as described above, in the case of the first current application step, although the three times Tx1, Ty1, and Tx2 are set to equal values to those in the second current application step, the second current application stop time Ty2 is set to the first stop time Tstp1 (<Tstp2) smaller than the second stop time Tstp2 of the second current application step.

Therefore, in the case of the first current application step, at a timing when the second current application time Tx2 has elapsed and the current reaches the peak current value A1, a period from when the current switch 28 is turned off to when the current switch 28 is turned on again is shorter than that in the second current application step. As a result, the pulse current rises again while falling from the peak current value A1 to the bottom current value (value 0). As a result, the pulse current in the first current application step is shifted in a pulse waveform at a higher frequency than the pulse current in the second current application step.

In addition, as described above, the pulse current in the first current application step is shifted in a pulse waveform at a higher frequency than the pulse current in the second current application step, and a pulse current effective value Av_1 in the first current application step is thereby a value larger than a pulse current effective value Av_2 in the second current application step. That is, in the first current application step, a power, that is, the amount of heat supplied to the metal sheet laminate W1 to W3 is larger than that in the second current application step.

Next, an example of test data when the metal sheet laminate W1 to W3 is welded by the above spot welding control process will be described. In this test, a galvanized high-tensile steel sheet having a thickness of 0.5 mm and a high carbon content was used as the first metal sheet W1, and a hot-pressed steel sheet having a thickness of 1.8 mm and a yield stress of 1500 MPa was used as the second metal sheet W2. Furthermore, as the third metal sheet W3, a cold high-tensile steel sheet having a thickness of 1.6 mm and a yield stress of 980 MPa was used.

In addition, in the metal sheet laminate W1 to W3, a sheet thickness ratio, which is a ratio of the total thickness of the metal sheet laminate W1 to W3 to the thickness of the first metal sheet W1, is set to a value 7.8. Furthermore, as conditions for spot welding, in both the first DC chopping control and the second DC chopping control, the peak current value A1 was set to 14.6 kA, and the peak duration described above was set to a value 0.

Spot welding was performed under the above conditions to obtain test data illustrated in FIGS. 8 to 10. FIG. 8 illustrates data of a lower limit value (11.63 kA) of a pulse current effective value in the first current application step and a lower limit value (5.35 kA) of a pulse current effective value in the second current application step when a sufficient weld diameter (5.35 mm) on the first metal sheet W1 side was obtained in a state where occurrence of expulsion on the second metal sheet W2 side and the third metal sheet W3 side could be suppressed.

In addition, FIG. 9 illustrates data of an upper limit value (12.79 kA) of the pulse current effective value in the first current application step and an upper limit value (7.68 kA) of the pulse current effective value in the second current application step when a sufficient weld diameter (6.3 mm) on the first metal sheet W1 side was obtained in a state where occurrence of expulsion on the second metal sheet W2 side and the third metal sheet W3 side could be suppressed.

Furthermore, FIG. 10 illustrates data of a width between the lower limit value and the upper limit value in FIGS. 8 and 9, that is, data of a width (1.16 kA) of the pulse current effective value in the first current application step and a width (1.07 kA) of the pulse current effective value in the second current application step. As is clear from FIG. 10, according to the spot welding method of the present embodiment, it is found that an appropriate current width of 1 kA or more can be ensured in both the first current application step and the second current application step. That is, it is found that the metal sheet laminate W1 to W3 can be reliably welded while occurrence of expulsion is suppressed in a state where an appropriate current width of 1 kA or more is ensured.

Note that the above test data is an example when ON or OFF of the current switch 28 is controlled in a form in which the above-described peak maintenance control is omitted in both the first DC chopping control and the second DC chopping control. However, according to a test of the present applicant, it has been confirmed that a similar effect can be obtained even when ON or OFF of the current switch 28 is controlled in a form in which the above-described peak maintenance control is executed.

Note that the first embodiment is an example in which the first current application time Tx1, the first current application stop time Ty1, and the second current application time Tx2 are set to equal values between the first current application step and the second current application step, but may be set to different values. For example, the first current application time Tx1 in the first current application step may be set to a value larger than the first current application time Tx1 in the second current application step, and the second current application time Tx2 in the first current application step may be set to a value larger than the second current application time Tx2 in the second current application step. Furthermore, the first current application stop time Ty1 in the first current application step may be set to a value smaller than the first current application stop time Ty1 in the second current application step.

In addition, the test data of the first embodiment is an example in which a laminate of the first to third metal sheets W1 to W3 in which the sheet thickness ratio is set to a value 7.8 is used as the metal sheet laminate. However, the metal sheet laminate of the present invention is not limited thereto, and may be any laminate as long as the sheet thickness ratio, which is a ratio of the total thickness of three or more metal sheets to the thickness of at least one metal sheet, is 3.5 or more, and more preferably 3.5 to 10.

Meanwhile, the first embodiment is an example in which the current switch 28 is used as the switching portion, but the switching portion of the present invention is not limited thereto, and may be any switching portion as long as the switching portion executes switching between current application and current application stop to a pair of electrodes. For example, a switching element may be used as the switching portion.

Next, a spot welding method according to a second embodiment of the present invention will be described with reference to FIG. 11. In the case of the spot welding method of the present embodiment, as illustrated in FIG. 11, pulse waveforms in DC chopping control during a first current application step and during a second current application step are different from those in the spot welding method of the first embodiment.

In the case of the present embodiment, peak current values during the first current application step and during the second current application step are set to the same value A1, and the peak current value A1 is maintained for a predetermined time.

Furthermore, in a case where a current application time and a current application stop time for generating a pulse waveform for one pulse in the first current application step are represented by Ton1 and Toff1, respectively, and a current application time and a current application stop time for generating a pulse waveform for one pulse in the second current application step are represented by Ton2 and Toff2, respectively, Ton1=Ton2 and Toff1<Toff2 are satisfied.

With the above configuration, also in the spot welding method of the second embodiment, similarly to the spot welding method of the first embodiment, the pulse current effective value Av_1 in the first current application step is larger than the pulse current effective value Av_2 in the second current application step. That is, in the first current application step, a power, that is, the amount of heat supplied to the metal sheet laminate W1 to W3 is larger than that in the second current application step.

As a result, also in the spot welding method of the second embodiment, similarly to the spot welding method of the first embodiment, the metal sheet laminate W1 to W3 can be reliably welded while occurrence of expulsion is suppressed.

Next, a spot welding method according to a third embodiment of the present invention will be described with reference to FIG. 12. In the case of the spot welding method of the present embodiment, as illustrated in FIG. 12, pulse waveforms in DC chopping control during a first current application step and during a second current application step are different from those in the spot welding method of the first embodiment.

In the case of the present embodiment, peak current values during the first current application step and during the second current application step are set to the same value A1. Furthermore, between the current application time Ton1 and the current application stop time Toff1 for generating a pulse waveform for one pulse during the first current application step and the current application time Ton2 and the current application stop time Toff2 for generating a pulse waveform for one pulse during the second current application step, Ton1>Ton2 and Toff1=Toff2 are satisfied.

With the above configuration, also in the spot welding method of the third embodiment, similarly to the spot welding method of the first embodiment, the pulse current effective value Av_1 in the first current application step is larger than the pulse current effective value Av_2 in the second current application step. That is, in the first current application step, a power, that is, the amount of heat supplied to the metal sheet laminate W1 to W3 is larger than that in the second current application step.

As a result, also in the spot welding method of the third embodiment, similarly to the spot welding method of the first embodiment, the metal sheet laminate W1 to W3 can be reliably welded while occurrence of expulsion is suppressed.

Next, a spot welding method according to a fourth embodiment of the present invention will be described with reference to FIG. 13. In the case of the spot welding method of the present embodiment, as illustrated in FIG. 13, pulse waveforms in DC chopping control during a first current application step and during a second current application step are different from those in the spot welding method of the first embodiment.

In the case of the present embodiment, peak current values during the first current application step and during the second current application step are set to the same value A1. Furthermore, between the current application time Ton1 and the current application stop time Toff1 for generating a pulse waveform for one pulse during the first current application step and the current application time Ton2 and the current application stop time Toff2 for generating a pulse waveform for one pulse during the second current application step, Ton1>Ton2 and Toff1<Toff2 are satisfied.

With the above configuration, also in the spot welding method of the fourth embodiment, similarly to the spot welding method of the first embodiment, the pulse current effective value Av_1 in the first current application step is larger than the pulse current effective value Av_2 in the second current application step. That is, in the first current application step, a power, that is, the amount of heat supplied to the metal sheet laminate W1 to W3 is larger than that in the second current application step.

As a result, also in the spot welding method of the fourth embodiment, similarly to the spot welding method of the first embodiment, the metal sheet laminate W1 to W3 can be reliably welded while occurrence of expulsion is suppressed.

Figure 14:
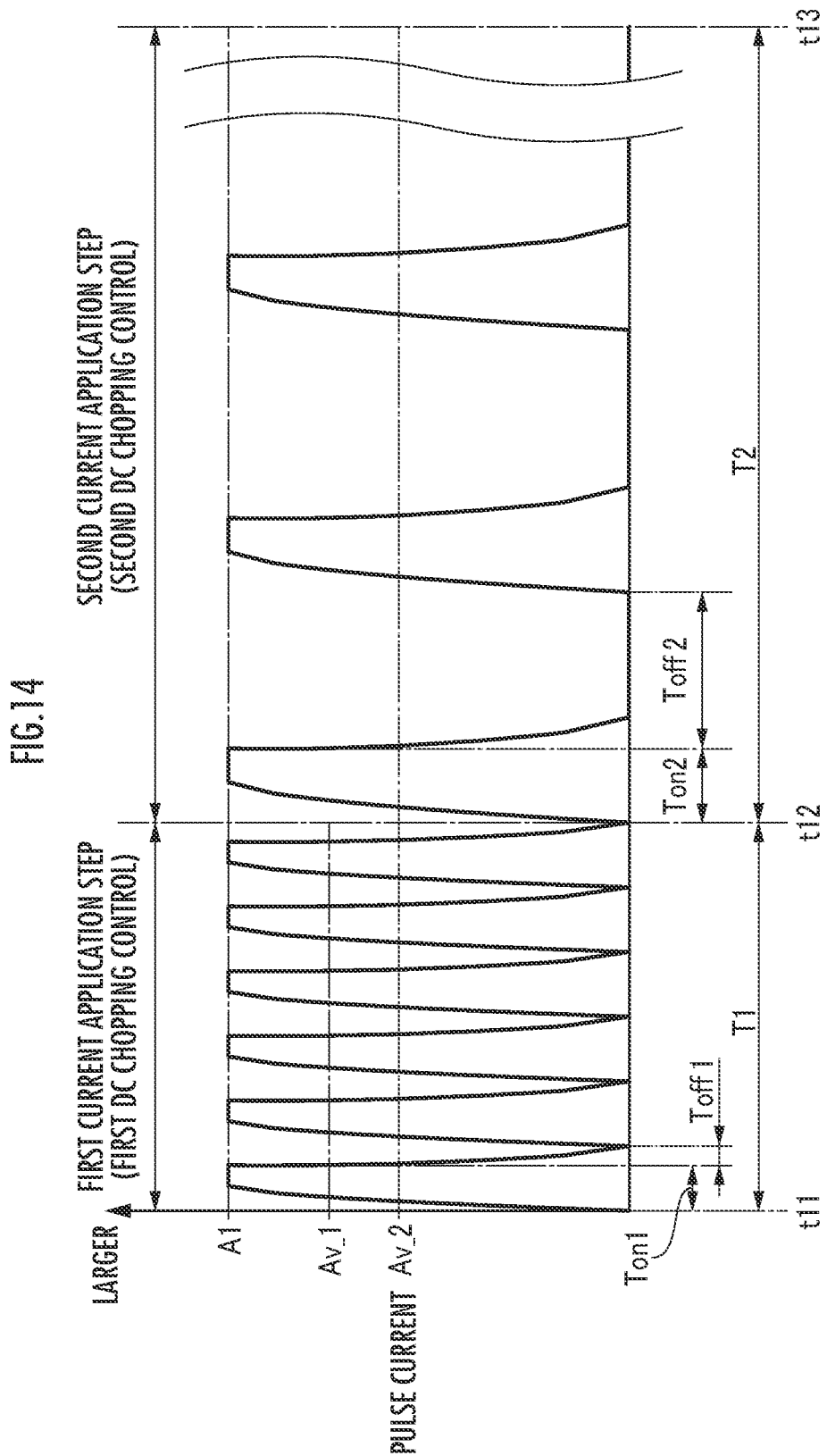
FIG. 14 is a timing chart illustrating a pulse waveform during execution of a spot welding process according to a fifth embodiment.

Next, a spot welding method according to a fifth embodiment of the present invention will be described with reference to FIG. 14. In the case of the spot welding method of the present embodiment, as illustrated in FIG. 14, pulse waveforms in the DC chopping control during the first current application step and during the second current application step are different from those in the spot welding method of the first embodiment.

In the case of the present embodiment, peak current values during the first current application step and during the second current application step are set to the same value A1. Furthermore, between the current application time Ton1 and the current application stop time Toff1 for generating a pulse waveform for one pulse during the first current application step and the current application time Ton2 and the current application stop time Toff2 for generating a pulse waveform for one pulse during the second current application step, Ton1<Ton2 and Toff1<<Toff2 are satisfied.

With the above configuration, also in the spot welding method of the fifth embodiment, similarly to the spot welding method of the first embodiment, the pulse current effective value Av_1 in the first current application step is larger than the pulse current effective value Av_2 in the second current application step. That is, in the first current application step, a power, that is, the amount of heat supplied to the metal sheet laminate W1 to W3 is larger than that in the second current application step.

As a result, also in the spot welding method of the fifth embodiment, similarly to the spot welding method of the first embodiment, the metal sheet laminate W1 to W3 can be reliably welded while occurrence of expulsion is suppressed.

Note that the first fifth embodiments are examples in which the peak current value in the first current application step and the peak current value in the second current application step are set to the same value A1, but the peak current value in the first current application step and the peak current value in the second current application step may be set to different values. For example, the peak current value in the first current application step may be set to a value larger than the peak current value in the second current application step.

REFERENCE SIGNS LIST

10 Spot welding device
12 Upper electrode tip (one of pair of electrodes)
22 Lower electrode tip (the other of the pair of electrodes)
W1 First metal sheet
W2 Second metal sheet
W3 Third metal sheet
Ty2 Second current application stop time (current application stop time)
Tstp1 First stop time (current application stop time in first current application step)
Tstp2 Second stop time (current application stop time in second current application step)
T1 First process time
T2 Second process time
A1 Peak current value
A2 Lower limit peak current value (lower limit value of peak current range)
Ton1 Current application time in first current application step
Toff1 Current application stop time in first current application step
Ton2 Current application time in second current application step
Toff2 Current application stop time in second current application step

The invention claimed is:

1. A spot welding method for disposing a metal sheet laminate formed by laminating three or more metal sheets such that at least one metal sheet of the three or more metal sheets is thinner than the other metal sheets, between a pair of electrodes, and causing a pulse current to flow between the pair of electrodes to join the metal sheets, wherein
the pulse current is applied in a first current application step and a second current application step continuous with the first current application step, the second current application step having a period longer than a period of the first current application step, the first current application step and the second current application step each being performed using a DC chopping control method,
in the DC chopping control method, a pulse waveform of the pulse current is generated by switching between current application and current application stop to the pair of electrodes by a switching portion, and
a peak current value of the pulse current in the first current application step is set to a value equal to or larger than that of the pulse current in the second current application step, and an amount of power of the pulse current in the first current application step is set to a value larger than that of the pulse current in the second current application step.

2. The spot welding method according to claim 1, wherein the peak current value of the pulse current in the first current application step is set to a value equal to that of the pulse current in the second current application step, a current application time for generating the pulse waveform for one pulse in the pulse current in the first current application step is set to a value equal to that in the pulse current in the second current application step, and a current application stop time for generating the pulse waveform for one pulse in the pulse current in the first current application step is set to a value smaller than that in the pulse current in the second current application step.

3. The spot welding method according to claim 1, wherein the peak current value of the pulse current in the first current application step is set to a value equal to that of the pulse current in the second current application step, a current application time for generating the pulse waveform for one pulse in the pulse current in the first current application step is set to a value larger than that in the pulse current in the second current application step, and a current application stop time for generating the pulse waveform for one pulse in the pulse current in the first current application step is set to a value equal to or smaller than that in the pulse current in the second current application step.

4. The spot welding method according to claim 1, wherein the peak current value of the pulse current in the first current application step is set to a value equal to that of the pulse current in the second current application step, and a current application time and a current application stop time for generating the pulse waveform for one pulse in the pulse current in the first current application step are set to values smaller than those in the pulse current in the second current application step.

5. The spot welding method according to claim 1, wherein the pulse current has a pulse waveform that periodically repeats a state in which the pulse current reaches a peak current value that is an upper limit value of a preset peak current range from a value lower than a lower limit value of the peak current range, then falls from the peak current value to the lower limit value of the peak current range, rises again to the peak current value, and falls from the peak current value to a value lower than the lower limit value of the peak current range.

6. The spot welding method according to claim 1, wherein the pulse current has a pulse waveform that periodically repeats a state in which the pulse current reaches a preset peak current value from a value lower than the peak current value, then falls from the peak current value to a value lower than the peak current value, and rises again to the peak current value.

7. The spot welding method according to claim 1, wherein the metal sheet laminate is formed such that a sheet thickness ratio, which is a ratio of a total thickness of the three or more metal sheets to a thickness of the at least one metal sheet, is 3.5 or more.

8. The spot welding method according to claim 2, wherein the metal sheet laminate is formed such that a sheet thickness ratio, which is a ratio of a total thickness of the three or more metal sheets to a thickness of the at least one metal sheet, is 3.5 or more.

9. The spot welding method according to claim 3, wherein the metal sheet laminate is formed such that a sheet thickness ratio, which is a ratio of a total thickness of the three or more metal sheets to a thickness of the at least one metal sheet, is 3.5 or more.

10. The spot welding method according to claim 4, wherein the metal sheet laminate is formed such that a sheet thickness ratio, which is a ratio of a total thickness of the three or more metal sheets to a thickness of the at least one metal sheet, is 3.5 or more.

11. The spot welding method according to claim 5, wherein the metal sheet laminate is formed such that a sheet thickness ratio, which is a ratio of a total thickness of the three or more metal sheets to a thickness of the at least one metal sheet, is 3.5 or more.

12. The spot welding method according to claim 6, wherein the metal sheet laminate is formed such that a sheet thickness ratio, which is a ratio of a total thickness of the three or more metal sheets to a thickness of the at least one metal sheet, is 3.5 or more.

\* \* \* \* \*